Aug. 15, 1961 W. F. THORNBURGH 2,996,145
FILTER SEALING MEANS

Filed Sept. 17, 1958 2 Sheets-Sheet 1

INVENTOR.
William F. Thornburgh
BY
L. D. Burch
ATTORNEY

Aug. 15, 1961 W. F. THORNBURGH 2,996,145
FILTER SEALING MEANS
Filed Sept. 17, 1958 2 Sheets-Sheet 2
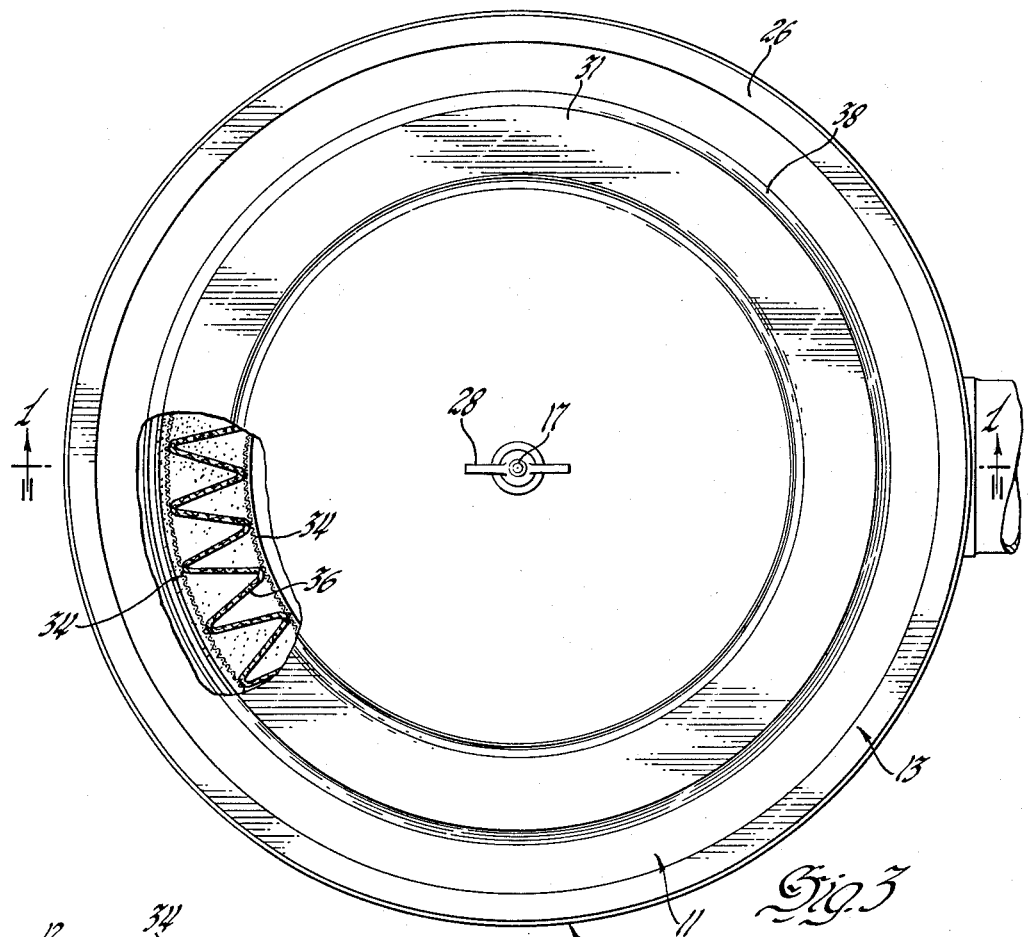
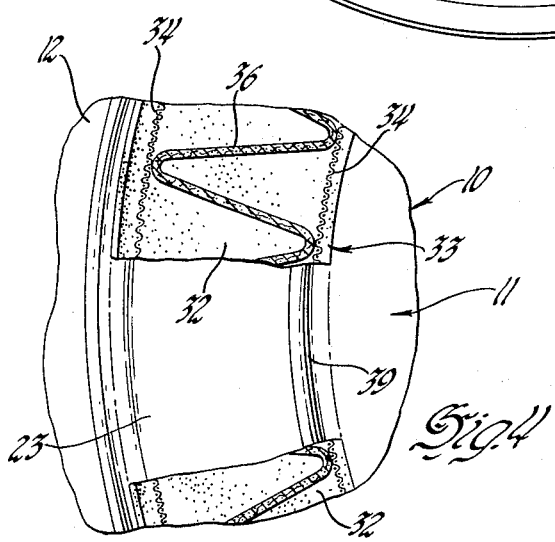
INVENTOR.
William F. Thornburgh
BY
L. D. Burel
ATTORNEY

United States Patent Office 2,996,145
Patented Aug. 15, 1961

2,996,145
FILTER SEALING MEANS
William F. Thornburgh, Flint, Mich., assignor to General Motors Corporation, Detroit, Mich., a corporation of Delaware
Filed Sept. 17, 1958, Ser. No. 761,639
2 Claims. (Cl. 183—73)

This invention relates to a filter element to be used in cleaner silencer assemblies for automotive and other purposes.

It is proposed to provide a filter element having end plates the edges of which may be deformed to seal the element in the filter casing. The filter casing also is provided with ridges which are adapted to depress the end plates at the opposite edges of the filter element for further sealing the filter element in the filter casing.

In the drawings:

FIGURE 1 is taken substantially on the plane of line 1—1 of FIGURE 3 looking in the direction of the arrows thereon.

FIGURE 3 is a plan view of the structure disclosed by FIGURE 1 with a part of the structure broken away to better illustrate the filter element therein. FIGURE 3 is taken substantially in the plane of line 3—3 on FIGURE 1 looking in the direction of the arrows thereon.

FIGURE 4 is an enlarged fragmentary view of the structure illustrated by FIGURE 2 taken substantially in the plane of line 4—4 on FIGURE 2 and looking in the direction of the arrows thereon.

Figure 1:
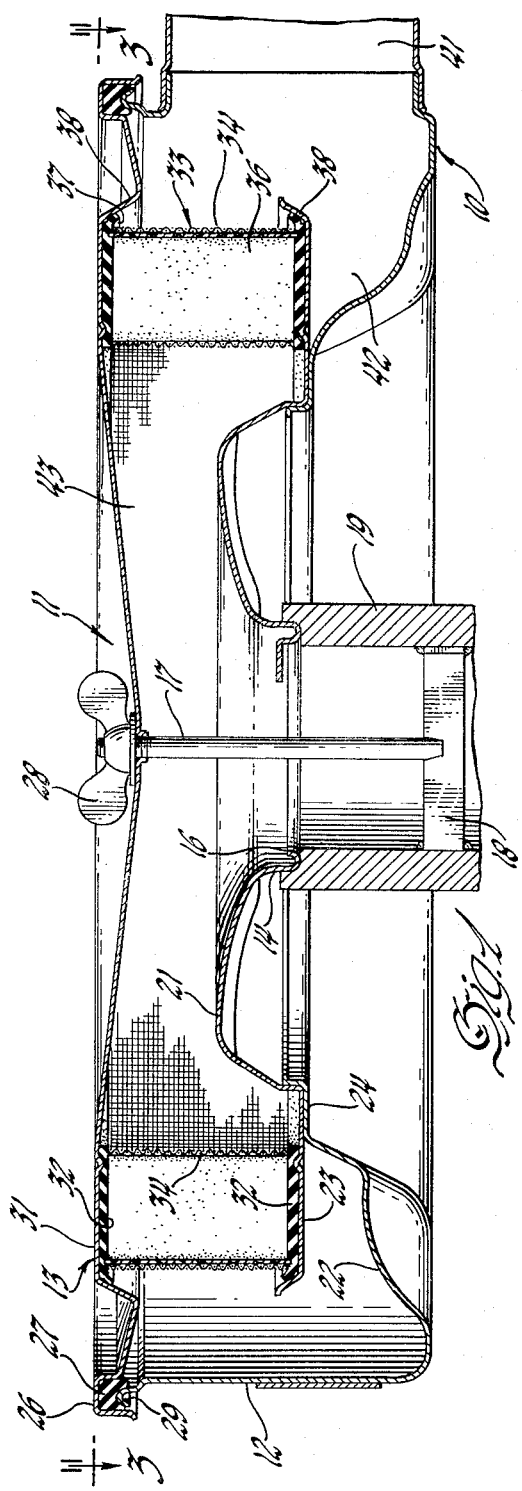
FIGURE 1 is a vertical cross sectional view of a cleaner silencer assembly in which the filter element and the casing are provided with means for sealing the filter element in the casing.

The cleaner silencer assembly 10 embraces a sheet metal container 11 which includes a casing 12 and a cover 13. The casing 12 has a centrally disposed outlet 14 formed therein with a flanged lower edge 16 adapted to be secured by a bolt 17 and spider 18 to the inlet 19 forming a part of the induction system of an internal combustion engine or other device to which air in large quantities may be supplied.

A casing 12 may be formed of two stampings 21 and 22, the stamping 21 includes the outlet 14, the stamping 22 being formed to provide an annular shelf or support 23 adapted to extend within the casing 12. The stamping 22 may have a flanged edge 24 on which the support 23 may be secured and may extend below the support 23 and upwardly around and in an annularly spaced relation to the outer edge of the support 23. The cover 13 has an annular channel 26 at the outer edge thereof in which a gasket 27 is adapted to be secured. The cover is secured on the casing 12 by a wing nut 28 engaging the bolt 17 and with a gasket 27 engaging the rolled upper edge 29 of the stamping 22. Inwardly of the channel 26 the cover 13 is formed to provide an annular support 31 similar to but oppositely disposed and spaced from the support 23.

The supports 23 and 31 are adapted to engage end plates 32 forming parts of an annular filter element 33 and to secure the filter element 33 in operative position in the filter container 11. The supports 23 and 31 being formed of sheet metal are relatively rigid and not easily deformable while the end plates 32 being formed of any suitable thermally setting plastic substance are easily deformable and elastic. The end plates 32 have inner and outer screens 34 and accordion pleated filter means 36 embedded therein, the pleated filter means being sealed at the ends between end plates 32, the screens being secured in the end plates 32 for supporting the filter element 33 between the supports 31 and 23.

In order to provide a proper seal between the supports 31 and 23 and the end plates 32 it is proposed to provide radially outwardly projecting flanges 37 on the peripheral edges of the end plates 32. The supports 31 and 23 outwardly of the end plates 32 are flanged toward one another as is indicated at 38 to engage and bend the ends of the flanges 37 toward one another.

Figure 2:
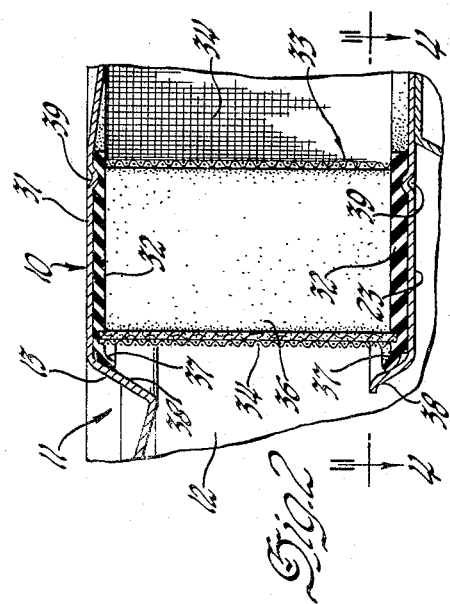
FIGURE 2 is an enlarged fragmentary cross sectional view of the casing and filter element structure shown by FIGURE 1.

When the filter element 33 is disposed in position on the support 23 and the cover 13 is secured in place by the wing nut 28, the flanges 38 will bend the flange 37 of the end plates 32 as is indicated by FIGURE 2. This bending of the flanges 37 tends to seal the filter element 33 between the supports 31 and 23 so that no air will flow between the end plates 32 and the supports 31 and 23.

To further seal the end plates 32 between the supports 31 and 23 it is proposed to provide annular ridges 39 in the supports 31 and 23, the ridges being formed to project inwardly of the end plates 32 adjacent the inner edges of the end plates 32. When the cover 13 is secured in place on the filter element 33, the ridges 39 will project into and will deform the end plates 32, for further sealing the end plates 32 and the supports 31 and 23.

Air may enter the casing 11 through the inlet 41, may flow into the inlet chamber 42 surrounding the filter element 33, may flow through the filter element 33 and into the outlet chamber 43 within the filter 33, and then into the induction system of the engine through the outlet 14.

I claim:

1. A cleaner-silencer assembly comprising an annular filter element having annular end plates, said end plates having edges projecting laterally outwardly from said filter element and being laterally bendable outside of said filter element, a casing having an upper edge and being adapted to contain said filter element and having a lower annular support for one of said end plates, said support being relatively rigid and not easily deformable and having an upwardly sloping annular flange at one edge thereof and upwardly bending said outwardly projecting flange of said one of said end plates axially of said filter element, and a cover for said casing having a downwardly formed annular inclined surface formed between the center and the outer edge thereof and adapted to engage the other of said end plates and bend said outwardly projecting flange of said other of said end plates axially of said filter element for sealing said filter element in said casing, said cover having an annular recess formed therein outwardly of said inclined surface for receiving a resilient seal member and the edge of said casing to seal said casing.

2. The air cleaner-silencer assembly set forth in claim 1 wherein said lower annular support and said cover are provided with ridges projecting toward said filter element adjacent the inside of said filter element and into and deforming said end plates for further sealing said filter element in said casing.

(References on following page)

References Cited in the file of this patent

UNITED STATES PATENTS

| | | | |
|---|---|---|---|
| 2,122,111 | Poelman et al. | June 28, | 1938 |
| 2,170,074 | Hewett | Aug. 22, | 1939 |
| 2,632,526 | Brock | Mar. 24, | 1953 |
| 2,732,031 | Rabbitt | Jan. 24, | 1956 |
| 2,771,156 | Kasten | Nov. 20, | 1956 |
| 2,848,065 | Sebok | Aug. 19, | 1958 |
| 2,871,976 | Sebok | Feb. 3, | 1959 |

FOREIGN PATENTS

| | | | |
|---|---|---|---|
| 329,099 | Great Britain | May 15, | 1930 |
| 50,786 | France | Dec. 24, | 1940 |
| | (1st addition to No. 857,420) | | |
| 491,730 | Italy | of | 1954 |
| 196,667 | Austria | Mar. 25, | 1958 |